(No Model.)

J. A. VARLEY.
COMBINED BROILER AND TOASTER.

No. 483,882. Patented Oct. 4, 1892.

Witnesses:
F. R. Cameron
John E. Cameron

Inventor:
James A. Varley
by Donald C. Ridout & Co.
Attys.

UNITED STATES PATENT OFFICE.

JAMES A. VARLEY, OF TORONTO, CANADA.

COMBINED BROILER AND TOASTER.

SPECIFICATION forming part of Letters Patent No. 483,882, dated October 4, 1892.

Application filed January 14, 1892. Serial No. 418,088. (No model.) Patented in Canada February 20, 1892, No. 38,315.

*To all whom it may concern:*

Be it known that I, JAMES ARTHUR VARLEY, of the city of Toronto, in the county of York, in the Province of Ontario, Canada, have invented a certain new and Improved Combined Broiler and Toaster, of which the following is a specification.

The object of the invention is to design a cooking utensil which may be used for broiling meat or toasting bread; and it consists in the peculiar construction, arrangement, and combinations of parts hereinafter more particularly described and then definitely claimed.

Figure 1:
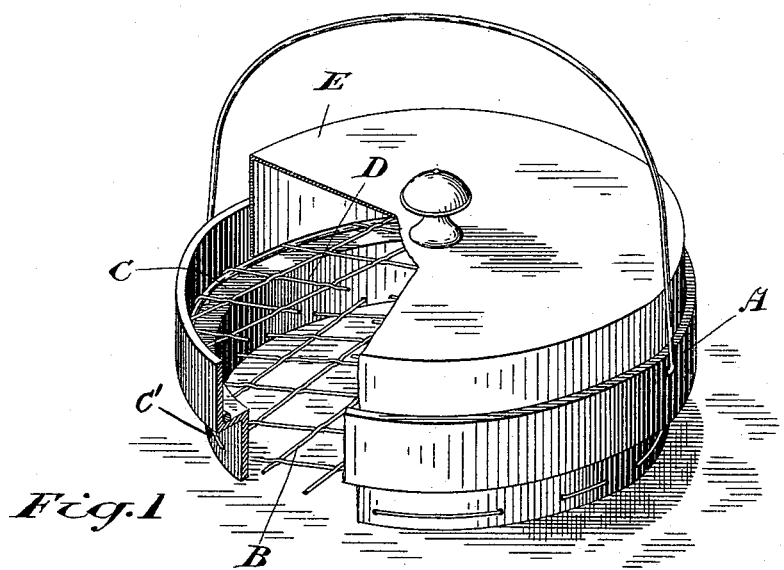
Figure 2:
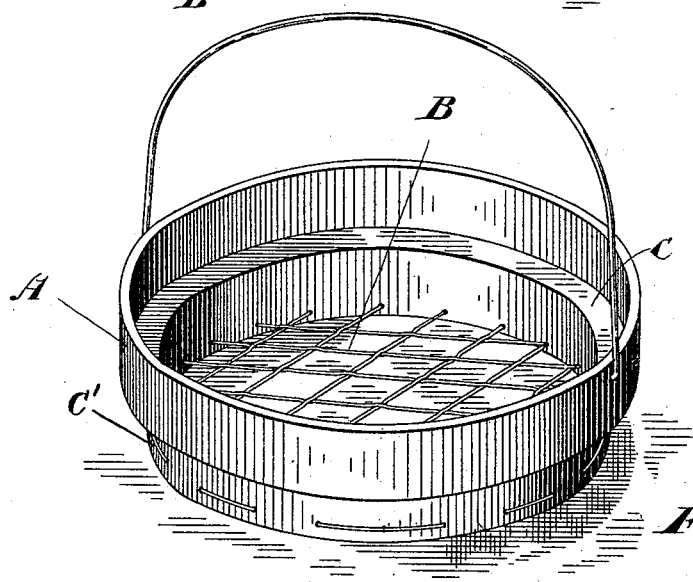
Figure 3:
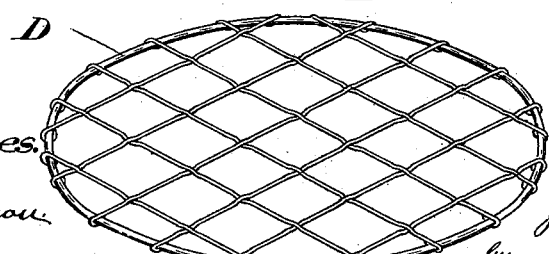

In the accompanying drawings, Figure 1 is a perspective view of my combined broiler and toaster, partially broken away to expose its construction. Fig. 2 is a perspective view of the broiler with the top rack removed. Fig. 3 is a perspective view of the rack removed.

In the drawings, A represents a ring, preferably made of cast-iron and designed to fit the pot-hole of the stove.

B is an open wire rack made substantially as shown and preferably fixed to the bottom of the ring A, although, if desired, it may be made detachable. On the inside of the ring A, I form a ledge C, designed to support the detachable rack D, made substantially as shown. From the bottom of the ledge C is a downwardly-projecting portion C', which enters a pot-hole of a stove far enough to allow the bottom of the ledge C to rest on the flange of said pot-hole when the utensil is firmly supported.

E is a cover designed to fit the ring A, preferably inside of it upon the ledge C.

When I wish to use my utensil as a broiler, I remove the cover E, and if the fire is low I also remove the rack D and place the meat upon the lower ring A. I then place the cover E in place and the fire will do its work, and the cover E will prevent the escape of any disagreeable odor. If there is a bright fire, I use the movable ring D; but I do not confine myself to the use of any particular ring, whether the fire be high or low. When the cover E is in position, it covers the pot-hole, and thereby protects the fire, so that it receives the full benefit of the draft in the stove.

Among the advantages of wire racks I may mention that practically little or no meat is covered by it. Therefore all parts of the meat are directly in contact with the fire, thereby enabling the steak or other piece of meat to be quickly cooked and also giving it the full flavor it derives from direct contact with the fire. I usually employ the top rack D for toasting bread; but I do not confine myself to the use of either of the racks for any specific purpose.

I do not limit myself to the use of any particular kind of material nor to any specific size, as the material may be varied to suit the taste of the manufacturer and the size be altered to suit different-sized stoves.

What I claim as my invention is—

In a combined broiler and toaster, the ring A, having an inwardly-extending ledge C, a downwardly-projecting portion C', extending from the inner margin of the ledge and adapted to enter a pot-hole of a stove, and a rack B, secured to the portion C', in combination with the detachable rack D and cover E, both fitting inside of ring A and supported by the ledge C, substantially as described.

Toronto, January 5, 1892.

JAMES A. VARLEY.

In presence of—
    EDWARD A. FORSTER,
    A. M. NEFF.